United States Patent
Ban

[15] 3,673,345
[45] June 27, 1972

[54] SOUND CONTROL APPARATUS FOR A MAGNETIC TAPE PLAYER FOR CUTTING OFF SOUND FROM THE SPEAKER DURING FAST FEED

[72] Inventor: Itsuki Ban, 829 Higashi-Oizumimachi, Nerima-ku, Tokyo-to, Japan

[22] Filed: May 26, 1970

[21] Appl. No.: 40,523

[52] U.S. Cl. ..................................179/100.2 S, 179/100.2 K
[51] Int. Cl. ......................................G11b 5/44, G11b 15/10
[58] Field of Search ..............................179/100.2 S, 100.2 R

[56] References Cited

UNITED STATES PATENTS 3,166,328 1/1965 Roberts ...........................179/100.2 S

*Primary Examiner*—Bernard Konick
*Assistant Examiner*—Robert S. Tupper
*Attorney*—Jacobs & Jacobs

[57] ABSTRACT

A reproducing output sound control apparatus for a magnetic tape player which is capable of enabling the magnetic tape to change from a normal driving to a fast driving comprises a tape speed changing device operatively changing over the tape speed from normal to fast and vice versa, and a circuit incorporated in a tape reproducing circuit including a switch operable in association with operation of the tape speed changing device, and a condenser and its power supply, the tape speed changing device being operable when changed into a condition that the tape is fast driven to change the switch into a condition that the current supply to the tape reproducing circuit is broken off and to discharge the condenser thereby breaking off the output of the tape reproducing circuit, the tape reproducing circuit slowly becoming operative in connection with the charge of the condenser when the tape speed changing device is changed into a condition that the tape is normally driven.

3 Claims, 6 Drawing Figures

SOUND CONTROL APPARATUS FOR A MAGNETIC TAPE PLAYER FOR CUTTING OFF SOUND FROM THE SPEAKER DURING FAST FEED

BACKGROUND OF THE INVENTION

This invention relates to a sound control apparatus for a reproducing tape player and in particular to a sound control apparatus of the type which impedes the unpleasant sound from the speaker when the tape speed is changed from fast to normal and vice versa.

Heretofore many expedients have been proposed to eliminate or impede the unpleasant sound from the speaker when the magnetic tape player, especially the endless magnetic tape cartridge player is operated in which the tape is fed at fast speed while being in contact with the magnetic head. There has been provision of a switch to disconnect current supply to an amplifier or break off connection of the speaker with the amplifier for the speaker simultaneously with changing over the tape speed from normal ( playing speed ) to fast speed in order to impede the unpleasant sound from the speaker of high level in high frequency. In this instance, there is still defect such as the click noise which presents in closing and opening of the switch. If an attempt is made to prevent the click noise so that a condenser of high capacity is incorporated in the switching circuit, there would be still the unpleasant sound of high level in high frequency after the tape speed has been changed to fast since the delay is caused with respect to the time constant drived from the condenser during the time the input signal for the speaker is broken off. If the time constant is reduced to quickly break off the input signal to the speaker, the input signal may be applied to the speaker before the tape speed is converted to the normal playing speed whereby the above mentioned unpleasant sound is generated from the speaker.

The inventor has succeeded in solving the above described problems by providing a new and improved apparatus as will described hereinafter.

SUMMARY OF THE INVENTION

It is a primary object of the invention to provide a sound control apparatus for the magnetic tape player, which is capable of impeding the unpleasant sound from the speaker when the tape speed is changed from fast to normal and vice versa.

Another object of the invention is to provide a sound control apparatus for the magnetic tape player, which is capable of impeding the reproducing sound from the speaker when not only the tape speed is changed to fast but also when the tape speed is changed to normal ( playing speed ) to gradually increase the reproducing sound.

A further object of the invention is to provide to a sound control apparatus, wherein a switch actuated by an operating lever in a changing means for changeover operation of the tape speed and a condenser are provided between an amplifier for driving and a power source whereby in response to operation of the changing means to drive the tape at fast speed the switch is opened and the condenser is discharged to break off the current supply to the amplifier to deactuate the latter while in response to operation of the changing means to drive the tape at normal playing speed the switch is closed and the condenser is charged to allow the amplifier to be in operative condition thereby making the reproducing sound.

Further objects and additional features of the invention will become apparent from the following detailed description and annexed drawings, wherein:

DESCRIPTION OF THE PREFERRED EMBODIMENTS

Figure 1:
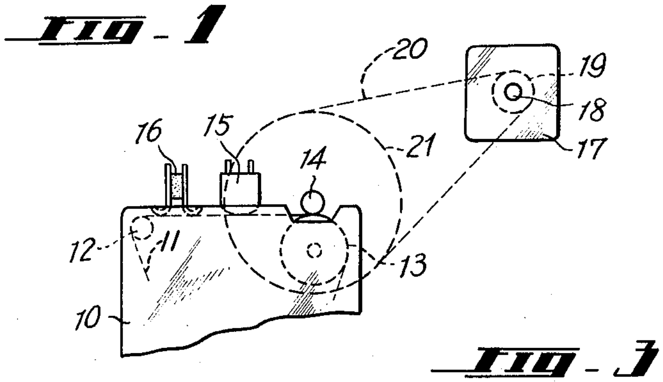
FIG. 1 is a representation schematically showing one embodiment of an endless magnetic tape cartridge player to which the present invention is employed.

Referring to the drawings, particularly to FIG. 1, the description is made in which the reference numeral 10 indicates a well known endless magnetic tape cartridge partially shown. The endless magnetic tape cartridge includes a generally rectangular housing storing an endless magnetic tape 11 wound or unwound in a conventional manner, a tape guide 12, and a pinch roller 13. The cartridge 10 in FIG. 1 is shown as being held in a predetermined playing position. The player comprises a rotary capstan 14 for driving the tape 11 in cooperation with the pinch roller 13, a magnetic head 15 adapted to transduce the tape, and an endmark detector 16 detecting a conductive patch ( not shown ) as endmark on the tape 11. The capstan 14 may be suitably driven, as for example, by a motor 17 through belt and pulleys. A motor pulley 19 is attached to the output shaft 18 of the motor 17 and is adapted to drive a pulley 21 attached to the capstan 14 via a belt 20.

In order to change the tape speed from normal ( playing speed ) to fast, number of rotation of the capstan 14 may be increased. To this end, the motor 17 which enables its output shaft 18 to selectively rotate at fast or low speed is used.

Figure 3:
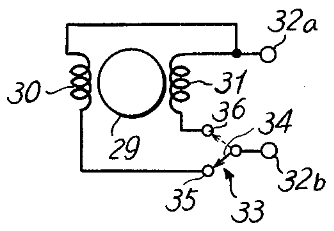
FIG. 3 is a circuit diagram for another motor used in the player shown in FIG. 1, FIGS. 4 and 5 representations schematically showing mechanisms different from each other for changing over the switch shown in FIGS. 2 and 3.
Figure 2:
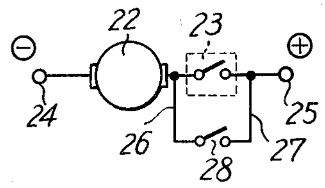
FIG. 2 is a circuit diagram for the motor used in the tape player shown in FIG. 1.

Modified forms of the motor 17 are further shown in FIGS. 2 and 3.

A motor 22 in FIG. 2 is shown as a DC motor having a conventional governor 23 of two contacts closed or opened in association with rotation of its output shaft ( not shown ). One terminal 24 of the motor 22 is connected to the minus pole of the DC power source ( not shown ) while the other terminal 25 is connected to the plus pole of the DC power source. A switch 28 is connected through leads 26, 27 in series with the governor 23. The motor 22 is adapted to rotate at low standard speed as predetermined when the switch 28 is opened to operate the governor 23 controlling the current flow. At this moment, the tape 11 ( FIG. 1 ) is driven at normal playing speed. On the contrary, the switch 28 is closed to constantly apply the current to the motor independently of closing or opening of the governor 28 to thus rotate the motor 22 at fast speed. At which time the tape 11 is run at fast speed.

A motor 29 in FIG. 3 is shown as induction motor available for bipole and octapole and is provided with an octapole coil 30 and bipole coil 31. One end each of coils 30 and 31 is connected to the terminal **32*a* while the other end of the coil 30 is connected to a fixed contact 35 of a changing switch 33 and the other end of the coil 31 is connected to the other fixed contact 36 of the changing switch 33. A common movable contact 34 of the changing switch 33 is connected to a terminal 32*b*. The alternating current is applied from the AC power source ( not shown ) between the terminals 32*b* and 32*a*. When the changing switch is such that the movable contact 34 comes in contact with the fixed contact 35, the alternating current is applied to the coil 30 to thus allow the motor 30 to be operated as the octapole motor. At this time the motor 30 is rotated at low speed to drive the tape at normal playing speed. On the other hand, when the changing switch 33 is changed over in a manner that the movable contact 34 comes in contact with the fixed contact 36, AC is applied to the coil 31 to allow the motor 30 as the bipole motor. Accordingly, the motor 30 is rotated at speed four times as fast as low speed while the tape 11** is driven at speed four times as fast as normal playing speed.

Figure 5:
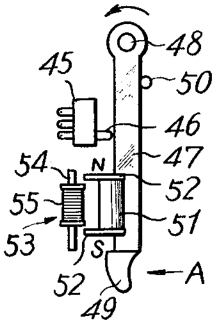
Figure 4:
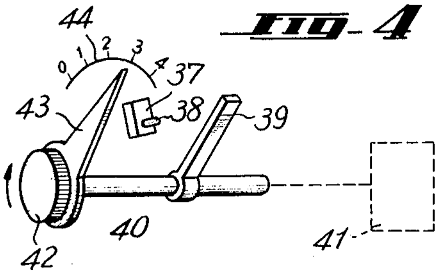

A mechanism for operating the switch 28 or the changing switch 33 to control the fast tape driving is shown in two forms in FIG. 4 and FIG. 5.

In FIG. 4, the numeral 37 designates a micro switch which includes opening and closing contacts corresponding to the switch 28 or the changing switch 33. A lever 39 is provided to operate an actuator 38 of the micro switch and is mounted to a shaft 40 coupled to a conventional clockwork 41 shown by the dotted lines. The shaft 40 is provided with a knob 42 with a pointer 43 which points one of digits such as "0, 1, 2, - - - 5" described in a scale 44 in opposition to the pointer. The shaft 40 is normally positioned to allow the pointer to indicate the digit "0" where the lever 39 presses the actuator 38 of the micro switch 37. When the micro switch 37 is actuated by the lever 39, the tape 11 is driven at normal playing speed. Now, the shaft 40 is rotated by the knob 42 in the direction of the arrow as shown to break off operation of the micro switch 37 by the lever 39 thereby changing the tape speed from normal ( playing speed ) to fast. Assume that the shaft 40 is manually rotated until the pointer 43 designates the digit " 3 ", then the shaft is gradually oriented to its original position while the tape is driven at fast speed in quantity as much as that by which the tape is driven at normal speed for 3 minutes, and thereafter the shaft is returned to a position where the pointer 43 indicates the digit " 0 ". This causes the micro switch 37 to be operated by the lever 39 to complete the fast tape driving thereby changing the tape speed to normal.

In FIG. 5, the numeral 45 designates a micro switch which includes opening and closing contacts corresponding to the switch 28 ( FIG. 2 ) or the changing switch 33 ( FIG. 3 ). A lever 47 is provided to actuate the switch 45 and is swingably pivoted to a pin 48. A knob 49 is mounted to the free end of the lever 47. The lever 47 is biased by a spring ( not shown ) in the direction of the arrow, however, movement of the lever thereby is limited by a stopper pin 50. The lever 47 is provided with a magnet 51 and a yoke 52 thereof. An electromagnetic device 53 is provided to an immovable portion of the player to oppose the magnet 49. The electromagnetic device 53 comprises a core 54 of mild steel and a coil 55 wound to the core. The micro switch 45 is normally not actuated by the lever 47 and the tape 11 is then conditioned to be driven at normal speed. Now, manual operation of the knob 49 to swing the lever 47 clockwise allows the core 54 of the electromagnetic device 53 to close the magnetic circuit of the yoke 52 whereby the lever 47 is held by the magnet 51 in the position where the lever 47 operatively depresses the actuator 46. As a result, the micro switch 45 is changed over to bring the tape 11 in the condition for the fast driving thereby driving the tape 11 at fast speed.

When the current is applied to the coil 55 of the electromagnetic device 53 in the direction that the magnetic flux of the magnet 51 is diminished, magnetic attraction of the core 54 with the yoke 52 is released to return the lever 47 to the position where the micro switch 45 is deactuated. Thus, the tape speed is changed from fast to normal.

Figure 6:
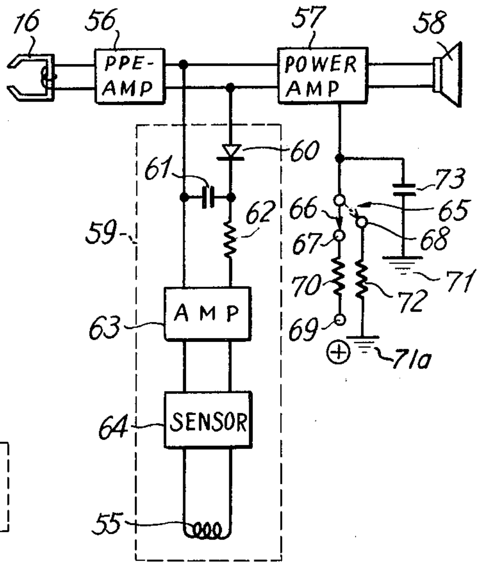
FIG. 6 is a circuit diagram incorporating the sound control apparatus of the invention therein.

FIG. 6 shows a magnetic tape reproducing circuit, a control circuit for applying the current to the coil 55 to diminish the magnetic flux of the magnet 51, and the sound control apparatus. In this instance, the magnetic head 15 adapted to transduce the magnetic tape 11 ( FIG. 1 ) is applied to a pre-amplifier 56. The output of the pre-amplifier 56 is in turn applied to a power amplifier 57 which drives a speaker 58. The output of the pre-amplifier 56 is also applied to a rectification circuit which, as shown by the dotted lines, comprises a diode 60, a condenser 61, and a resistor 62. The output signal of the pre-amplifier 56 which has been rectified by the rectification circuit is amplified by an amplifier 63 and is then applied to a sensor 64. The sensor 64 is constituted by such an electrical circuit as to provide an output pulse if an input signal does not exist for a predetermined short period of time. Accordingly, when the tape 11 is driven at fast speed, a non-recorded zone between one recorded zone and a successive recorded zone on the tape 11 passing through the magnetic head 16 will diminish the reproducing signal so that the output pulse is generated from the sensor 64. The coil 55 of the electromagnetic device 53 is connected to the output terminal of the sensor 64 and the output pulse from the sensor 64 is drained to the coil 55. In response to drainage of the output pulse from the sensor 64 to the coil 55, the lever 47 ( FIG. 5 ) is returned to a position where the micro switch 45 ( FIG. 5 ) is deactuated to end the tape fast driving thereby changing the tape speed to normal.

A switch indicated at 65 is included in the micro switch 37 or 45 and is adapted to be changed in a manner that a common movable contact 66 becomes in contact with a fixed contact 67 when the micro switch 37 or 45 is set to drive the tape at normal speed or the common movable contact 66 comes in contact with the other fixed contact 68 when the micro switch 37 or 45 is set to drive the tape at fast speed. The fixed contact 67 of the switch 65 is connected through a resistor 70 to a terminal 69 connected to the plus side of the power source ( not shown ) for the power amplifier 57. On the other hand, the fixed contact 68 of the switch 65 is connected through a resistor 72 to a ground 71*a* connected to the minus side of the power source ( not shown ). The common movable contact 66 of the switch 65 is connected to the power amplifier 57 and the ground 71 via the condenser 73.

When the tape 11 is driven at normal, as shown, the movable contact 66 is in contact with the fixed contact 67 to apply the voltage to the power amplifier 57 to thus actate the power amplifier 57. Thus, the speaker 58 makes the reproducing sound for the tape 11. If the micro switch 37 or 45 is operated to cause the tape to be driven at fast speed, the switch 65 is caused to come in contact with the fixed contact 68 as the movable contact 66 is moved away from the fixed contact 67. In response to withdrawal of the movable contact 66 from the fixed contact 67, the current supply to the power amplifier 57 is broken off and in response to contact of the movable contact 66 with the fixed contact 68 charge on the condenser 73 is rapidly discharged by the resistor 72. As a result, the power amplifier is caused to promptly end its operation. Therefore, the tape speed is changed from normal to fast at the same time that the reproducing output sound from the speaker 58 is broken off so that the unpleasant reproducing sound is not generated from the speaker 58 even during the interval that the tape speed is changed from normal to fast or even if the tape speed has been converted to fast. Moreover, the pulse generated in change of the switch 65 may be absorbed by the condenser 73 to prevent the click noise from the speaker 58 when the switch 65 is changed over. When the micro switch 37 or 45 is changed to allow the tape speed to change from fast, the common movable contact 66 is moved away from the fixed contact 68 and comes in contact with the fixed contact 67. Consequently, the condenser 73 is gradually charged by the resistor 70 to actuate the power amplifier 57 to make the reproducing output sound from the speaker 58. Where the capacity of the condenser 73 and the resistance value of the resistor 70 may be suitably determined, the power amplifier 57 is not acutated during the time the tape speed is changed from fast to normal and is thereafter actuated after the tape speed is changed to normal thereby producing the reproducing output sound from the speaker. Therefore, the speaker 58 does not make any unpleasant reproducing sound during the course that the tape speed is changed from fast to normal.

As described in the above, according to the present invention, when the tape speed is changed from normal to fast, the power amplifier 57 is rapidly deactuated whereas when the tape speed is changed from fast to normal, the power amplifier 57 is slowly actuated so that any unpleasant sound is not made from the speaker 58 by change in the tape speed. Further, the reproducing output sound provides fade-in effect when the tape speed is changed from fast to normal.

In the embodiment as shown in FIG. 6, the switch 65 controls the current supply to the power amplifier 57, however, the current supply to the reproducing circuit including the power amplifier 57 and the pre-amplifier 56 may be controlled when the control circuit 59 is not employed. Although the switch 65 is included in the micro switch 37 or 45, such switch may be an individual switch operatively changeable in relation to operation of the changing means.

Although the invention has been described with reference to preferred embodiments, it is apparaent that many modifications may be made by those skilled in the art.

What is claimed is:

1. A sound control apparatus for a magnetic tape player including a tape drive device for selectively driving the magnetic tape at normal playing speed or fast speed, and a tape reproducing circuit for reproducing the magnetic tape, comprising: a tape speed changing means for selectively switching said tape drive device from a first condition wherein said tape is driven at normal playing speed to a second condition wherein said tape is driven at fast speed or from said second condition to said first condition; a switch movable between two positions and being connected between a power supply for operating said tape reproducing circuit and said tape reproducing circuit to control the current supply to said tape reproducing circuit, said switch being operated in association with operation of the tape speed changing means, said switch being operable to be in a first position to supply current to said tape reproducing circuit to actuate said tape reproducing circuit to thus obtain the reproducing output from said tape reproducing circuit when the tape speed changing means is operated to switch said tape drive device to the first condition and to be in a second position when said tape speed changing means is operated to switch said tape drive device to the second condition; a condenser connected to the power supply through the switch when the switch is in the first position and to be thereby charged with the power supply; a discharge circuit for discharging the condenser, said switch being operable when in said second position to connect said condenser to said discharge circuit so that the current supply to the tape reproducing circuit is broken off and said discharge circuit discharges the condenser to rapidly end actuation of said tape reproducing circuit during the time said tape is driven at fast speed whereby a reproducing output is not obtained from said tape reproducing circuit, the connection between the condenser and said discharge circuit through said switch being disconnected when the switch is returned to the first position in response to operation of the tape speed changing means to switch said tape drive device to the first condition where said tape is driven at said normal playing speed; a resistor for slowly charging the condenser when the switch is returned to the first position and connected between the power supply and the condenser, the condenser being slowly charged by said resistor to operate said tape reproducing circuit when the tape is driven at normal playing speed by the tape speed driving device, said tape reproducing circuit being actuated after a predetermined period of time and providing the reproducing output.

2. A reproducing output sound control apparatus for a magnetic tape player in accordance with claim 1, wherein said discharge circuit includes a resistor connected in parallel with said condenser through the switch when said switch is changed over to said second position.

3. A reproducing output sound control apparatus for a magnetic tape player in accordance with claim 1, wherein said tape reproducing circuit includes a magnetic head for transducing said tape, a pre-amplifier for amplifying the output of the magnetic head, and a power amplifier for amplifying the output of the pre-amplifier to drive a speaker, said switch being operable to control the current supply to only the power amplifier.

* * * * *